(12) United States Patent
Paek

(10) Patent No.: US 7,089,808 B2
(45) Date of Patent: Aug. 15, 2006

(54) TORQUE SENSOR FOR VEHICLE STEERING SYSTEM

(75) Inventor: Seung-Ho Paek, Uijeongbu (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/045,338

(22) Filed: Jan. 31, 2005

(65) Prior Publication Data

US 2006/0123926 A1    Jun. 15, 2006

(30) Foreign Application Priority Data

Dec. 10, 2004   (KR)  .................. 10-2004-0104195

(51) Int. Cl.
*G01L 3/14*   (2006.01)
(52) U.S. Cl. ................... 73/862.326; 73/862.325; 73/862.321; 73/862.191; 73/862.08
(58) Field of Classification Search .......... 73/862.326, 73/862.325, 862.321
See application file for complete search history.

(56) References Cited

U.S. PATENT DOCUMENTS

| | | | | |
|---|---|---|---|---|
| 5,406,834 A | * | 4/1995 | Taniguchi | ................ 73/118.1 |
| 5,412,998 A | * | 5/1995 | Nakamoto et al. | ..... 73/862.335 |
| 5,419,206 A | * | 5/1995 | Kamioka et al. | ...... 73/862.333 |
| 5,641,916 A | * | 6/1997 | Satoh et al. | ........... 73/862.331 |
| 5,796,014 A | * | 8/1998 | Chikaraishi et al. | ... 73/862.331 |
| 6,456,090 B1 | * | 9/2002 | Ishikawa et al. | ............ 324/546 |
| 6,591,699 B1 | * | 7/2003 | Ueno | .................... 73/862.331 |
| 6,622,576 B1 | * | 9/2003 | Nakano et al. | ........ 73/862.331 |
| 6,704,665 B1 | * | 3/2004 | Ueno | .......................... 702/41 |
| 6,807,871 B1 | * | 10/2004 | Paek | ..................... 73/862.339 |
| 6,957,589 B1 | * | 10/2005 | Ueno et al. | ............ 73/862.331 |

FOREIGN PATENT DOCUMENTS

JP        8-68703       3/1996

OTHER PUBLICATIONS

English Language Abstract of JP 8-68703.
U.S. Appl. No. 11/045,369, filed Jan. 31, 2005, Paek.
U.S. Appl. No. 11/045,332, filed Jan. 31, 2005, Paek.

* cited by examiner

*Primary Examiner*—Edward Lefkowitz
*Assistant Examiner*—Freddie Kirkland, III
(74) *Attorney, Agent, or Firm*—Greenblum & Bernstein, P.L.C.

(57) ABSTRACT

A torque sensor for a vehicle steering system includes a voltage boosting circuit, an oscillator, an offset voltage circuit part and a current amplifier. The torque sensor further includes a phase inversion part that outputs an offset voltage and a phase-inverted alternating current voltage which is in-phase with the voltage outputted from said oscillator, a waveform selecting part that rectifies the voltages outputted from said current amplifier and said phase inversion part, and first and second coils that are in series each other and connected at each end thereof to an output terminal of said waveform selecting part and an output terminal of said offset voltage circuit part, respectively.

6 Claims, 3 Drawing Sheets

TORQUE SENSOR FOR VEHICLE STEERING SYSTEM

CROSS-REFERENCE TO RELATED APPLICATIONS

The present application is based on, and claims priority from, Korean Application Serial Number 10-2004-0104195, filed on Dec. 10, 2004, the disclosure of which is hereby incorporated by reference herein in its entirety.

FIELD OF THE INVENTION

The present invention relates to a torque sensor for a vehicle steering system adapted to be stably supplied with power and prevent a distortion phenomenon of a torque detecting signal.

BACKGROUND OF THE INVENTION

Generally, an Electronic Control Unit (ECU) of an Electrical Power Steering (EPS) system controls the steering of a vehicle by detecting steering torque according to the manipulation of a steering wheel of a driver through a torque sensor.

For the torque sensor of the EPS system, a battery voltage inputted into the ECU is regulated in a regulator of the ECU and then used as a driving power of the torque sensor.

However, there is a drawback in the conventional torque sensor in that if the battery voltage is lower than a predetermined value due to an instantaneous overload of the vehicle or the like, the voltage outputted through the regulator of the ECU to the torque sensor turns into a low voltage, smaller than a tolerance of a rated voltage. This causes a decrease of the output of the torque sensor and the like by an abnormality of the torque sensor and results in an inaccurate steering of the vehicle.

There is another drawback in that if a phase variation occurs due to a temperature variation in the coil part of the torque sensor or the like, a distortion phenomenon of a torque detecting signal is generated by a lack of a precise sampling of the signal, thereby deteriorating the accuracy of the torque detecting signal.

SUMMARY OF THE INVENTION

Embodiments of the present invention are provided to stably provide power to a torque sensor even during a low voltage phenomenon of the battery due to an instantaneous overload of the vehicle. This is achieved by installing a boosting circuit part for boosting voltage provided from a power source and by using the boosted voltage as the power of the torque sensor.

The present invention is further provided to prevent a distortion phenomenon of a torque detecting signal due to a temperature variation of a coil part (temperature correcting coil and torque detecting coil) of the torque sensor for a steering system or the like.

A torque sensor for a vehicle steering system includes a voltage boosting circuit that boosts voltage provided from a power source. An oscillator oscillates by receiving boosted voltage from the voltage boosting circuit. An offset voltage circuit part generates an offset voltage by using the voltage of the power source. A current amplifier outputs an offset voltage and an alternating current voltage which is in-phase with a voltage outputted from the oscillator. A phase inversion part outputs an offset voltage and an alternating current voltage which is in-phase with the voltage outputted from the oscillator. A waveform selecting part rectifies the voltages outputted from the current amplifier and the phase inversion part. First and second coils are in series each other and connected at each end thereof to an output terminal of the waveform selecting part and an output terminal of the offset voltage circuit part, respectively. First and second resistances are in series each other and connected in parallel to the first and second coils. First and second peak detecting parts detect peak values of voltages of a contact part between the first and second resistances and a contact part between the first and second coils. A first differential amplifier executes differential amplification by receiving voltages from the first and second peak detecting parts. A first voltage-current converter outputs a torque detecting signal by converting voltage, which is outputted from the first differential amplifier, into a current.

The torque sensor further includes third and fourth resistances that are in series each other and connected in parallel to the first and second coils. Third and fourth peak detecting parts detect peak values of voltages of a contact part between the third and fourth resistances and the contact part between the first and second coils. A second differential amplifier executes differential amplification by receiving voltages from the third and fourth peak detecting part parts. A second voltage-current converter outputs a fail-safe torque detecting signal by converting voltage, which is outputted from the second differential amplifier, into a current.

The torque sensor further includes a third and fourth resistance that are in series and connected in parallel to the first and second coil. A third and fourth peak detecting part detect peak values of voltages of a contact part between the first and second coil and a contact part between the third and fourth resistance. A second differential amplifier executes differential amplification by receiving voltages from the third and fourth peak detecting part. A second voltage-current converter outputs a fail-safe torque detecting signal by converting voltage, which is outputted from the second differential amplifier, into a current.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
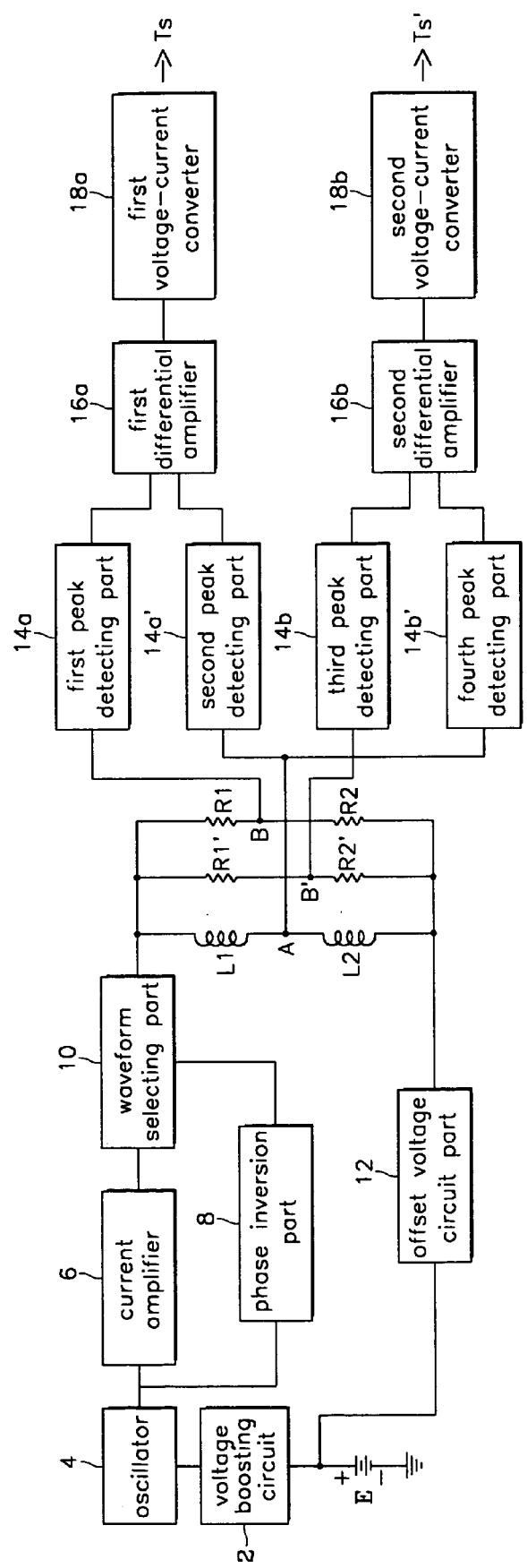
FIG. 1 is a block diagram of a torque sensor for a steering system according to an embodiment of the present invention.

Referring now to FIG. 1, an embodiment of the present invention includes a voltage boosting circuit 2 that boosts voltage provided from a power source (E). An oscillator 4 oscillates by receiving boosted voltage from voltage boosting circuit 2. An offset voltage circuit part 12 generates an offset voltage ($V_{offset}$) by using the voltage supplied from power source (E). A current amplifier 6 outputs an offset voltage ($V_{offset}$) and an alternating current (AC) voltage which is in-phase with a voltage outputted from oscillator 4. A phase inversion part 8 outputs an offset voltage ($V_{offset}$) and an alternating current voltages which is in-phase with the voltage outputted from oscillator 4 for 180°. A waveform selecting part 10 rectifies the voltages outputted from current amplifier 6 and phase inversion part 8. First and second coils (L1, L2) are in series each other and connected at each end thereof to an output terminal of waveform selecting part 10 and an output of the offset voltage circuit part 12, respectively. First and second resistances (R1, R2) are in series each other and connected in parallel to first and second coils (L1, L2). First and second peak detecting parts 14a, 14a' detect peak values of voltages of a contact part (B) between the first and second resistances (R1, R2) and a contact part (A) between the first and second coils (L1, L2). A first differential amplifier 16a executes differential amplification by receiving voltages from the first and second peak detecting parts 14a, 14a'. A first voltage-current converter 18a outputs a torque detecting signal (Ts) by converting voltage, which is outputted from first differential amplifier 16a, into a current.

The torque sensor according to the embodiment of the present invention is configured to detect a fail-safe torque, as follows.

Third and fourth resistances (R1', R2') are in series and connected in parallel to the first and second coils (L1, L2). Third and fourth peak detecting parts 14b, 14b' detect peak values of voltages of a contact part (B') between the third and fourth resistances (R1', R2') and the contact part (A) between the first and second coils (L1, L2), respectively. A second differential amplifier 16b executes differential amplification by receiving voltages from the third and fourth peak detecting parts 14b, 14b'. A second voltage-current converter 18b outputs a fail-safe torque detecting signal (Ts') by converting voltage, which is outputted from second differential amplifier 16b, into a current.

The fail-safe torque is required to make a steering by using fail-safe torque detecting signal (Ts') when an abnormality of a main circuit for torque detecting signal (Ts) or the like occurs.

Voltage boosting circuit 2 preferably has a circuit configuration that boosts the voltage, twofold or more, supplied from power source (E).

Offset voltage circuit part 12 generates an offset voltage ($V_{offset}$), relevant to a boosting multiple of the voltage from power source (E).

As boosted voltage is used as the power source of the torque sensor in the embodiment of the present invention, the offset voltage ($V_{offset}$) of a direct current (DC) voltage used in a circuit means including oscillator 4 should be changed corresponding to a boosting multiple. Compared to the conventional system in which the DC voltage of 3.5 V is used while the operation voltage of the torque sensor is less than 8 V, the boosting circuit configuration of the embodiment of the present invention should set an offset voltage to allow the DC voltage to operate at six or higher voltage while the operation voltage is 16 V.

Waveform selecting part 10 of the embodiment of the present invention can preferably be a half-wave rectifier circuit.

The operation of the torque sensor according to the embodiment of the present invention will now be described in detail with reference to drawings.

As illustrated in FIG. 1, when power is provided from power source (E) to voltage boosting circuit 2, the voltage inputted into voltage boosting circuit 2 is boosted. If the inputted voltage is 8 V, the voltage is boosted up to 16 V, 24 V or the like via voltage boosting circuit 2. The boosted voltage is used as an operation voltage of the torque sensor.

Figure 2:
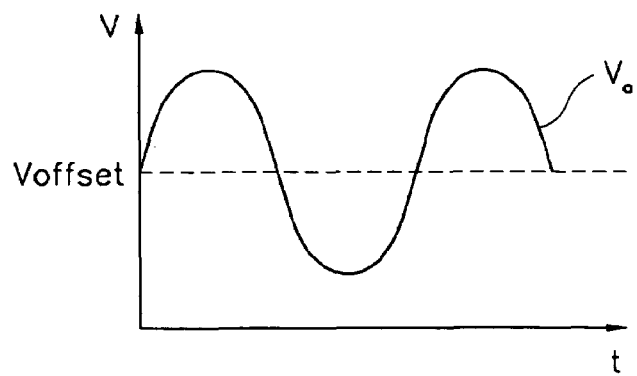
FIG. 2 illustrates a waveform of an output voltage of an oscillator according to an embodiment of the present invention.

An oscillation is performed in oscillator 4 by receiving the boosted voltage. As illustrated in FIG. 2, an oscillation voltage (Va) biased via a DC voltage ($V_{offset}$) inputted into oscillator 4 is outputted. The outputted oscillation voltage (Va) is inputted into current amplifier 6 and phase inversion part 8, respectively.

Figure 3A:
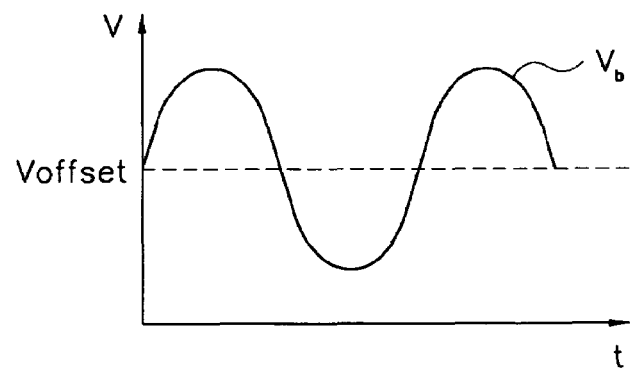
FIG. 3a illustrates a waveform of an output voltage of a current amplifier according to an embodiment of the present invention.
Figure 3B:
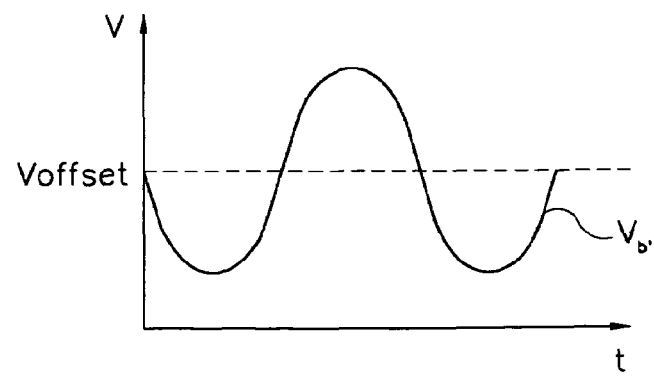
FIG. 3b illustrates a waveform of an output voltage of a phase inversion part according to an embodiment of the present invention.
Figure 4:
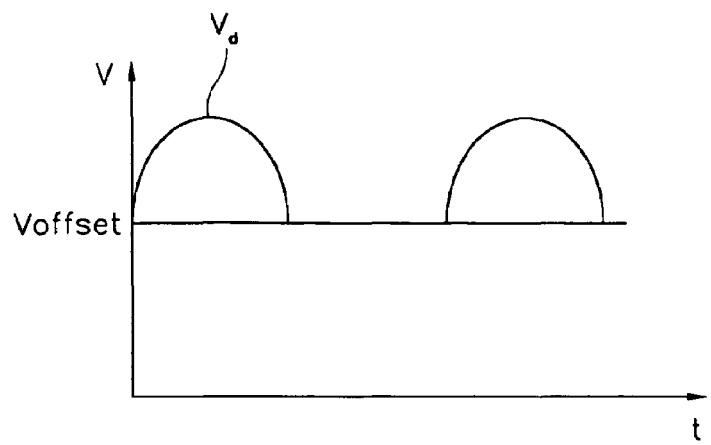
FIG. 4 illustrates a waveform of an output voltage of a waveform selecting part according to an embodiment of the present invention.

Current amplifier 6 outputs a DC voltage ($V_{offset}$) and an AC voltage (Vb), which is in-phase with voltage outputted from oscillator 4 (see FIG. 3a). Simultaneously, phase inversion part 8 outputs a DC voltage ($V_{offset}$) and an AC voltage (Vb'), which has inverted the phase of an AC voltage of oscillator 4 for 180° (see FIG. 3b). Waveform selecting part 10 selects and outputs only a half period of signals outputted from current amplifier 6 and phase inversion part 8. If a signal is outputted through current amplifier 6, a signal waveform selected in waveform selecting part 10 is illustrated in FIG. 4, and an output signal (Vd) is applied to the first coil, temperature correcting coil (L1).

The offset voltage ($V_{offset}$), relevant to the boosting multiple of the voltage of power source (E) is generated at offset voltage circuit part 12 and is supplied to the second coil, torque detecting coil (L2).

Signals outputted through waveform selecting part 10 and offset voltage circuit part 12 are applied to each temperature correcting coil (L1) and torque detecting coil (L2). The signal applied to temperature correcting coil (L1) is an AC voltage of half-period and an offset voltage ($V_{offset}$) of a DC voltage. The signal applied to torque detecting coil (L2) is only an offset voltage ($V_{offset}$) of a DC voltage.

Figure 5:
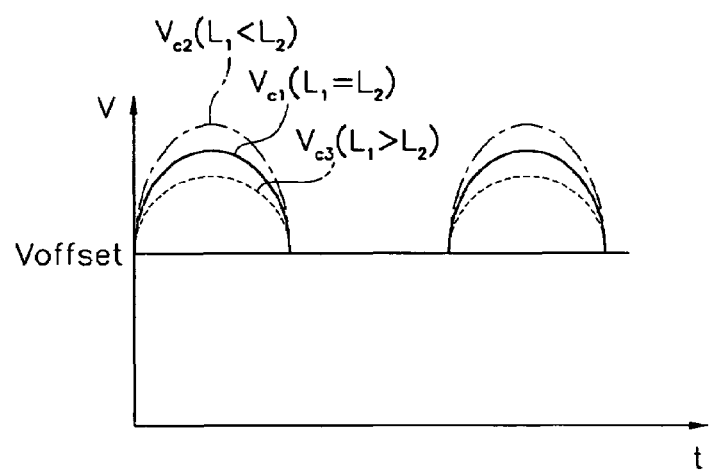
FIG. 5 illustrates a waveform of an output voltage from a first and second coil contact part according to an embodiment of the present invention.
Figure 6:
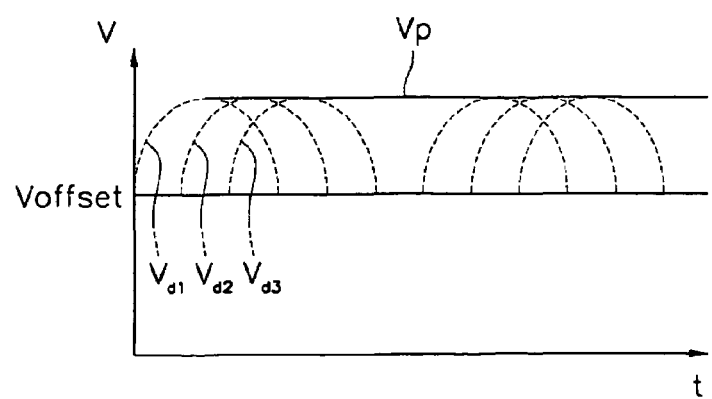
FIG. 6 illustrates a waveform of an output voltage of a peak detecting part according to an embodiment of the present invention.

After an application of the signals is made to temperature correcting coil (L1) and torque detecting coil (L2), an output signal waveform of contact part (A) between temperature correcting coil (L1) and torque detecting coil (L2) is illustrated in FIG. 5.

The amplitude of an AC voltage signal waveform of current amplifier 6 varies according to the amount of inductance of coils (L1, L2) (see FIG. 5). First and second resistances (R1, R2) are in series and connected in parallel to temperature correcting coil (L1) and torque detecting coil (L2). If the values of first and second resistances (R1, R2) are identical, the contact part (B) turns into a constant DC voltage ($V_{offset}$). If third and fourth resistances (R1', R2') have an identical value, the voltage of contact part (B') and the voltage of contact part (B) are identical.

Voltages of contact parts (A, B) of the first and second coils (L1, L2) and the first and second resistances (R1, R2) are provided to the first peak detecting part 14a and second peak detecting part 14a', respectively. First and second peak detecting part 14a and 14a' detect a peak value of an inputted signal waveform. In particular, second peak detecting part 14a detects peak value voltages (Vp) of AC voltage signal waveforms (Vd1, Vd2, Vd3).

The voltage supplied from the first and second peak detecting parts 14a, 14a' to the first differential amplifier 16a is differentially amplified and then the differential amplified signal is outputted as a torque detecting signal (Ts) through the first voltage-current converter 18a. The outputted torque detecting signal is inputted into an Electronic Control Unit (ECU, not shown); thus, a steering force is obtained by a motor operation according to torque detecting signal (Ts).

In the fail-safe torque detecting sensor according to the embodiment of the present invention, operations of the third and fourth peak detecting parts 14b, 14b', second differential amplifier 16b, and second voltage-current converter 18b are identical to of the main circuits of the torque detecting sensor described above. Fail-safe torque detecting signal (Ts') is employed to detect a torque in a fail-safe torque detecting sensor in case of an abnormality of the main circuit for torque detecting signal (Ts) or the like.

For the torque sensor of the present invention, power is stably supplied to the torque sensor under any circumstance by using boosted operation voltage, and a slight variation of the torque is even detected by an amplitude adjustment in oscillator 4, contributing to a decrease of the amplification ratio of the differential amplifier and an improvement of the signal-noise (S:N ratio) property. Further, a distortion phenomenon of the torque detecting signal is prevented by detecting a peak value of an AC voltage provided from the coil part of the torque sensor in case an amplitude and phase vary due to a temperature change of the coil part (temperature correcting coil and torque detecting coil) of the torque sensor or the like.

The technical concept is not limited to the embodiment of the present invention and should be determined by a logical interpretation within the scope of claims of the present invention.

As apparent from the foregoing, there is an advantage in that the stable power provision to the torque sensor and a signal-noise (S:N ratio) property are improved even under a low voltage of the battery due to an instantaneous overload of the vehicle.

Furthermore, a distortion phenomenon of the torque detecting signal according to a phase variation at the coil part due to a temperature variation or the like is prevented.

What is claimed is:

1. A torque sensor for a vehicle steering system, comprising:
    a voltage boosting circuit that boosts voltage provided from a power source;
    an oscillator that oscillates by receiving boosted voltage from said voltage boosting circuit;
    an offset voltage circuit part that generates an offset voltage by using said voltage of said power source;
    a current amplifier that outputs an offset voltage and an alternating current voltage which is in-phase with a voltage outputted from said oscillator;
    a phase inversion part that outputs an offset voltage and a phase-inverted alternating current voltage which is in-phase with the voltage outputted from said oscillator;
    a waveform selecting part that rectifies the voltages outputted from said current amplifier and said phase inversion part;
    first and second coils that are in series with each other and connected at each end thereof to an output terminal of said waveform selecting part and an output terminal of said offset voltage circuit part, respectively;
    first and second resistances that are in series with each other and connected in parallel to said first and second coils;
    first and second peak detecting parts that detect peak values of voltages of a contact part between said first and second resistances and a contact part between said first and second coils, respectively;
    a first differential amplifier that executes differential amplification by receiving voltages outputted from said first and second peak detecting parts; and
    a first voltage-current converter that outputs a torque detecting signal by converting voltage, which is outputted from said first differential amplifier, into a current.

2. The torque sensor as defined in claim 1, further comprising:
    third and fourth resistances being in series with each other and connected in parallel to said first and second coils;
    third and fourth peak detecting parts that detect peak values of voltages of a contact part between said third and fourth resistances and the contact part between said first and second coils;
    a second differential amplifier that executes differential amplification by receiving voltages from said third and fourth peak detecting parts; and
    a second voltage-current converter that outputs a fail-safe torque detecting signal by converting voltage, which is outputted from said second differential amplifier, into a current.

3. The torque sensor as defined in claim 2, wherein said offset voltage circuit part generates said offset voltage, which is boosted corresponding to a boosting multiple of said voltage boosting circuit.

4. The torque sensor as defined in claim 2, wherein said waveform selecting part includes a half-wave rectifier circuit.

5. The torque sensor as defined in claim 1, wherein said offset voltage circuit part generates said offset voltage, which is boosted corresponding to a boosting multiple of said voltage boosting circuit.

6. The torque sensor as defined in claim 1, wherein said waveform selecting part includes a half-wave rectifier circuit.

* * * * *